United States Patent [19]

Weskamp

[11] Patent Number: 5,372,240
[45] Date of Patent: Dec. 13, 1994

[54] CONVEYING SYSTEM HAVING CARRIER UNIT WITH BUMPER AND BRAKING CAPABILITIES AND METHOD OF SHOCK FREE CONVEYING

[76] Inventor: Robert Weskamp, 720 Dartmouth Dr., Buffalo Grove, Ill. 60089

[21] Appl. No.: 150,922

[22] Filed: Nov. 12, 1993

[51] Int. Cl.$^5$ .............................................. B65G 29/00
[52] U.S. Cl. ................................. 198/465.1; 198/795; 198/803.01
[58] Field of Search .............. 198/803.01, 795, 465.1, 198/465.2

[56] References Cited

U.S. PATENT DOCUMENTS

| | | |
|---|---|---|
| 2,424,055 | 7/1947 | Rousseau . |
| 3,049,214 | 8/1962 | Cormia et al. . |
| 4,168,775 | 9/1979 | Mueller ................... 198/803.01 |
| 4,220,435 | 9/1980 | Yeakey . |
| 4,605,121 | 8/1986 | Wahren .................... 198/803.01 |
| 4,946,025 | 8/1990 | Murphy ..................... 198/795 X |
| 4,981,207 | 1/1991 | Kuikka ..................... 198/803.01 |
| 5,002,175 | 3/1991 | Drexel et al. ................ 198/345.3 |
| 5,007,527 | 4/1991 | Ach et al. ................... 198/803.01 |
| 5,090,556 | 2/1992 | Ach et al. ................... 198/465.1 |
| 5,143,195 | 9/1992 | Bloecker .................... 198/345.3 |
| 5,170,876 | 12/1992 | Sticht ...................... 198/345.3 |
| 5,242,043 | 9/1993 | Sturm ...................... 198/345.3 |

Primary Examiner—Cheryl L. Gastineau
Attorney, Agent, or Firm—Baker & McKenzie

[57] ABSTRACT

A buffer/brake system is provided for carriers used in an automated assembly system. The rear ends of the carriers are equipped with a flexible ring that is compressed when the queued carrier is struck by an oncoming carrier. Compression of the flexible ring engages the sidewalls of the track support that accommodates the conveyor and the frictional engagement of the ring against the sidewalls of the track support act as a brake for the queued carrier. The ring also acts to absorb the shock resulting from the collision between the queued carrier and the oncoming carrier. The buffer/brake system is fully incorporated in and fixedly attached to the carrier and is not placed on the conveyor separately.

25 Claims, 1 Drawing Sheet

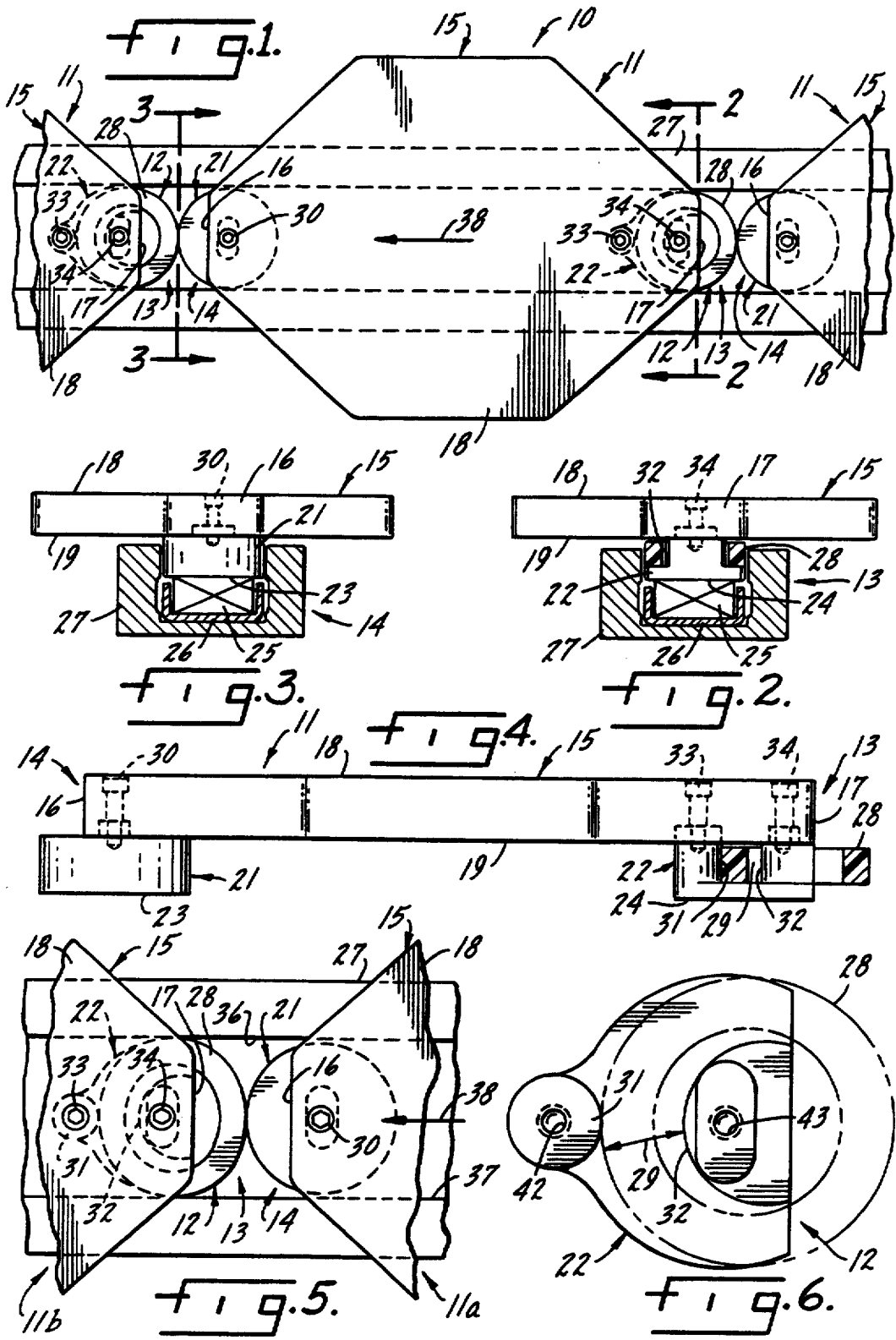

CONVEYING SYSTEM HAVING CARRIER UNIT WITH BUMPER AND BRAKING CAPABILITIES AND METHOD OF SHOCK FREE CONVEYING

FIELD OF THE INVENTION

This invention relates generally to conveyor systems for use in manufacturing operations such as automated assembly systems or machine tool loading operations. A specific application of this invention relates to conveyor systems for use in synchronous or non-synchronous assembly systems. Improved carriers are provided with bumper/braking capabilities to reduce shock transmitted when one moving or oncoming carrier slams into a stationary or queued carrier located downstream from the oncoming carrier on the moving conveyor. For ease of description, the invention will be described in the context of automated assembly operations.

BACKGROUND OF THE INVENTION

Automated conveyor systems for the assembly of products are well-known. Automated conveyor systems can be divided into two principal categories: synchronous and non-synchronous. The present invention is directed to non-synchronous assembly systems and specifically to the problem encountered when a moving carrier slams into or otherwise is stopped by a stationary or queued carrier located downstream from the moving carrier. The present invention is directed to an improved system that buffers the collision between two carriers thereby reducing shock transmitted to the products disposed on top of the carriers. The present invention further provides a means for preventing forward movement of a queued carrier and eliminating or drastically reducing shock transmission to the queued carrier as it is struck from behind by an oncoming carrier. The present invention may also provide a means for stopping an oncoming carrier as it engages a queued carrier.

Workpieces are transported from stage to stage in an assembly system by carriers or carrier assemblies which ride on top of the conveyor or conveyor chain. In a synchronous assembly system, a workpiece and carrier proceed through each stage of the assembly process and do not proceed to the next stage until the remaining workpieces are also ready to proceed to the next stage (i.e., each workpiece is in synch with the other workpieces). Thus, in synchronous assembly systems, the conveyor stops after each workpiece arrives at its respective processing stage and the stage or task that takes the greatest amount of time will limit the rate at which all other tasks or stages can be completed because the conveyor will not resume a forward motion until all the workpieces, including the workpiece at the slowest stage, are ready to proceed to the next stage.

In contrast, in non-synchronous assembly systems, the conveyor is continuously moving forward. Slower tasks are performed in multiple by employing combinations of divide modules or divide sections. At a divide section, carriers are routed from the main conveyor to spurs so that the slow task may be performed on a number of workpieces on the conveyor system at the same time. Divide sections are designed to send workpieces with the slowest task completed down the conveyor at the line rate or the rate at which the main conveyor chain is moving. After a slower task is completed, the workpiece is returned to the main conveyor chain via a merge module. A slower assembly task may also be performed by physically removing the workpiece and carrier from the conveyor, performing the task, and returning the workpiece and carrier to the conveyor where the workpiece and carriers are transported by the moving conveyor to the next stage. Because the workpieces and carriers are removed from the main conveyor chain either by physical displacement or by splitting workpieces off onto divide sections, the slower tasks to be performed do not become the limiting factor in the throughput of the system.

In buffer/queuing situations, a series of carriers may accumulate at a work station where a task is being performed. As an oncoming carrier arrives, it will slam into or engage a queued carrier that precedes it on the conveying line. To alleviate this situation, a buffer stop may be employed upstream of the work station to relieve the back pressure caused by the oncoming carriers. A queue stop may also be employed to protect the carrier at the work station from being hit or struck by an oncoming carrier because collisions between carriers result in the dissipation of kinetic energy which may dislodge the workpieces disposed on the carriers as well as disrupt the task being performed at the work station.

The carrier that is moving with the conveyor will hereinafter be referred to as the "oncoming" carrier; the carrier that is stopped and is waiting to be received at a work station or queue stop will hereinafter be referred to as a "queued" carrier.

U.S. Pat. No. 4,605,121 discloses the use of a freely disposed buffer ring that is placed on the conveyor between two carriers. One drawback to the system disclosed in the U.S. Pat. No. 4,605,121 is that the freely disposed buffers can often become separated from the carriers if the system includes divide or merge sections and thus their ability to perform their sole and essential task is lost; freely disposed buffers can only work if they are disposed between two carriers. Further, the freely disposed buffers do not carry workpieces and therefore consume space on the conveyor chain that could be utilized to carry workpieces.

Thus, there is a need for an improved carrier that includes built-in shock-absorbing and bumper capabilities to limit the impact on workpieces disposed on the queued carrier when an oncoming carrier forcefully engages it. Further, there is a need for a carrier that includes a built-in braking ability so that when an oncoming carrier engages a queued carrier, the queued carrier will not only absorb shock but will also act to brake itself thereby lessening the effect of the collision on the queued carrier and any other carriers disposed in front of the queued carrier. There is also a need for an improved bumper/braking system for mounting on the front ends of oncoming carriers that will act to brake an oncoming carrier at the point of impact with a queued carrier.

SUMMARY OF THE INVENTION

The present invention makes a significant contribution to the art of asynchronous automatic conveyor systems by providing an improved carrier equipped with both a bumper or shock absorbing means and braking means. The present invention provides a carrier with braking capabilities without extensive design modifications to existing carriers and further without any design modifications to the conveyor system, conveyor chain or support frames that support the conveyor chain.

The carrier equipped with the bumper/brake means provided by the present invention includes an upper surface for supporting the workpiece or fixture and an undersurface that either directly engages the moving conveyor or accommodates a means for engaging the moving conveyor. In the preferred embodiment, two pallet guides or carrier guides are provided as the means for engaging the conveyor. The front pallet guide is a standard pallet guide as taught by the prior art. The rear pallet guide, however, accommodates a flexible high friction ring that buffers the carrier against shocks incurred when the carrier is slammed into or is otherwise engaged by an oncoming carrier. The flexible ring is accommodated within the rear pallet guide or between the rear pallet guide and the undersurface of the carrier.

When the flexible ring is engaged by an oncoming carrier, the ring is simultaneously compressed in the longitudinal (or forward-rearward) direction and expands in the lateral (or side-to-side) direction. The lateral expansion of the ring causes the ring to engage the upwardly protruding sidewalls of the track section or support frame that accommodates the conveyor. The frictional engagement of the ring against the sidewalls of the track fixes the queued carrier in place; the force absorbing ability of the flexible ring, and its ability to divert shock forces outwardly toward the sidewall of the carrier support acts to brake the queued carrier as it is engaged by the oncoming carrier. Further, because the ring is flexible and resilient, the ring itself acts as a shock absorber and reduces the shock caused by the collision of the oncoming carrier with the stationary carrier and reduces the likelihood of dislodgement of workpieces from either the queued carrier or the oncoming carrier.

In the preferred embodiment, the flexible ring is accommodated within a channel or space disposed in the rear pallet guide. The rear pallet guide includes a rearwardly facing wall and a rear post. The channel that accommodates the ring is bound by the rear wall, which is preferably arcuately shaped, the rear post, a bottom surface of the channel, and the undersurface of the carrier. The rear pallet guide is preferably attached to the carrier at the rear wall and at the rear post which, in addition to the bottom of the channel and the undersurface of the carrier, define the channel that accommodates the flexible ring. Thus, the flexible ring is attached to the rear pallet guide and therefore is fixedly attached to the carrier.

In an alternative embodiment, the flexible ring is mounted to the front end of the carrier. The front carrier guide is designed in a manner similar to the rear carrier guide as discussed above and the rear carrier guide would be a standard carrier guide as discussed above. The front flexible ring on an oncoming carrier would then act to protect its associated carrier from undue amounts of shock and vibration caused by its collision with a queued carrier or other object in its path. The flexible ring carried by the front of said oncoming carrier would compress upon collision and act as a brake for the oncoming carrier.

In yet another alternative embodiment, both carrier guides, front and rear, could include channels for accommodating a flexible ring and flexible rings would be disposed at the front end and rear end of each carrier. The front flexible ring would act as a brake and as a shock absorber. The rear flexible ring would act as a shock absorber when engaged by an oncoming carrier and would also provide additional braking capacity.

It is therefore an object of the present invention to provide a carrier for use in a non-synchronous assembly system that is equipped with built-in shock absorbing and braking capabilities.

Another object of the present invention is to provide a carrier that brakes itself when it is engaged by an oncoming carrier.

Yet another object of the present invention is to provide a carrier that reduces the shock imparted to the workpiece disposed on the queued carrier and a workpiece disposed on an oncoming carrier when the queued carrier is engaged by an oncoming carrier.

Another object of the present invention is to provide a carrier that brakes itself when it engages a stationary object or carrier in its forward path.

Yet another object of the present invention is to provide a carrier that reduces the shock imparted to the workpiece carried by a moving carrier and a workpiece disposed on a stationary carrier when said moving carrier engages the stationary carrier that is in its forward path.

It is still another object of the present invention to provide an improved non-synchronous conveyor system where each carrier is capable of braking itself by engaging the track that supports the moving conveyor.

BRIEF DESCRIPTION OF THE DRAWINGS

This invention is illustrated more or less diagrammatically in the accompanying drawing, wherein:

FIG. 1 is a top plan view of a combination carrier and conveyor system made in accordance with the present invention;

FIG. 2 is a sectional view taken substantially along line 2—2 of FIG. 1;

FIG. 3 is a sectional view taken substantially along line 3—3 of FIG. 1 particularly illustrating the front end view of the carrier as shown in FIG. 1;

FIG. 4 is a side view of the carrier shown in FIG. 1;

FIG. 5 is a partial top plan view showing the engagement of the front end of an oncoming carrier engaging the rear end of a queued carrier; and FIG. 6 is an illustration of a flexible ring and rear carrier guide made in accordance with the present invention.

DETAILED DESCRIPTION OF THE INVENTION

Like reference numerals will be used to refer to like or similar parts from Figure to Figure in the following description of the drawing.

The dramatic improvement contributed by the present invention is best understood after comparing the present invention with the freely floating shock absorber/brake system taught by the prior art. Specifically, U.S. Pat. No. 4,605,121 discloses an individual non-restrained brake/buffer unit that rides on top of the conveyor between two carriers, but separate from the two carriers. When an oncoming carrier approaches a stationary carrier, the oncoming carrier collides with the freely disposed flexible ring and the ring is compressed between the stationary carrier and the oncoming carrier. The collapsed ring engages the side walls of the trough that accommodates the conveyor and acts as a brake for the oncoming carrier.

This specific design has certain drawbacks. First, the brake/buffer unit is freely disposed and unnecessarily consumes space on the conveyor and further does not carry any products or workpieces. Second, because the brake/shock-absorber units are separate components, additional components are placed on the conveyor. If an operator neglects to place a brake/buffer unit between two carriers, the brake/shock-absorber function will not be provided and the workpieces may be damaged after a collision between two adjacent carriers. Third, the additional brake/shock-absorber unit may get caught or jammed in divide sections where carriers are routed from the main conveyor chain for the performance of slower tasks on the workpieces. The separate brake/shock-absorber units may lose their place in line in these divide sections and therefore the brake/shock-absorber functions will not always be performed when needed. Fourth, the buffer unit of the U.S. Pat. No. 4,605,121 does not brake the queued carrier but only brakes the oncoming carrier. The queued carrier is pushed forward after it is engaged by the buffer unit. It would be preferable to provide an effective brake for the queued carrier to prevent it from colliding with other queued carriers down the line.

In contrast, as seen in FIG. 1, the present invention provides a conveyor system 10 equipped with carriers or carrier units 11 each including its own bumper/braking system 12 disposed at the rear end 13 of the carriers 11. The bumper/braking system 12 is not freely disposed between two carriers 11 but rather is fixedly attached to and contained within the rear end 13 of its respective carrier 11. In an alternative embodiment, the bumper/braking system 12 is disposed at the front end 14 of the carrier 11.

Referring to FIGS. 1 through 4 collectively, each carrier 11 includes a pallet 15 that includes a front end 16, a rear end 17, an upper surface 18 and an undersurface 19. A front carrier guide 21 is mounted to the front end 16 of the undersurface 19 of the pallet 15. A rear carrier guide 22 is mounted to the rear end 17 of the undersurface 19 of the pallet 15. As seen in FIGS. 2 and 3, the bottom surfaces 23, 24 of the carrier guides 21, 22 engage the conveyor chain 25. The conveyor chain 25 is supported in a liner 26 which, in turn, is contained within a track support or frame 27. The front carrier guide 21, also known as a front pallet guide 21, is of a cylindrical configuration and is attached to the undersurface 19 of the pallet 15 with a bolt 30.

On the other hand, the rear carrier guide 22, also known as a rear pallet guide 22, accommodates the flexible ring 28 which acts as the brake and shock absorber for the carrier 11. Referring specifically to FIG. 4, the flexible ring 28 is contained within an arcuate channel or space, indicated generally at 29, which is disposed within the rear carrier guide 22. The arcuate channel 29 is bound by a rear post 31 and a wall 32. Bolts 33 and 34 fixedly attach the rear post 31 and the wall 32 of the rear pallet guide 22 to the undersurface 19 of the pallet 15. Therefore, the flexible ring 28 is loosely confined within the arcuate channel or space 29 and is carried by the rear end 13 of the carrier 11 in a loosely restrained fashion so that the ring 28 is fixedly attached but loosely connected to the carrier 11.

Referring to FIG. 5, the carrier 11a shown at the right has engaged or otherwise slammed into the carrier 11b shown at the left. Upon impact, the ring 28 engages the front carrier guide 21 and compresses in the longitudinal or front-to-rear direction. The longitudinal compression of the ring 28 results in lateral expansion of the ring 28. As seen in FIG. 5, the ring 28 engages the side walls 36, 37 of the frame 27. The result is a frictional engagement between the ring 28 and the side walls 36, 37, the frictional engagement braking the forward movement of the carrier 11b in the direction of the arrow 38 (see also FIG. 1). Collision of the ring 28 with the rear carrier guide 22 also results in substantial shock absorption by the flexible ring 28.

The result of the collision shown in FIG. 5 is twofold. First, forward movement of the left carrier 11b is stopped by the engagement of the ring 28 with the side walls 36, 37. Second, kinetic energy released as a result of the collision between the right carrier 11a and the left carrier 11b is dissipated by the shock-absorbing capacity of the flexible ring 28 and any resulting vibrations to workpieces disposed on the pallets 15 of either carrier 11a, 11b is minimized. Thus, the flexible ring 28 acts not only as a brake but also as a shock absorber in order to reduce or eliminate any damage to or dislodgement of the workpieces disposed on top of the carriers (the workpieces are not shown in the Figures).

Turning to FIG. 6, the preferred embodiment of the rear carrier guide 22 is illustrated. The flexible ring 28, indicated in phantom, is disposed within an arcuate channel or space, shown generally at 29. The channel 29 is bound by a rear post 31 and a wall 32. In the preferred embodiment shown in FIG. 6, the post 31 and wall 32 serve as a means to attach the rear carrier guide 22 to the undersurface 19 of the pallet 15. The bolt 34 (See FIG. 4) is accommodated in the hole 43 disposed in the wall 32. The rear carrier guide 22 is also attached to the undersurface 19 of the pallet 15 at the hole 42 disposed aft of the rear post 31 which accommodates the bolt 33 (See FIG. 4).

Thus, a combination brake/shock absorber is built into a carrier 11 that can be used with a non-synchronous conveyor system such as the system 10 shown in FIGS. 1 through 6. The buffer/brake systems 12 are fully incorporated in and carried by the carriers 11. The buffer/brake systems 12 do not require a separate carrier and therefore do not take up additional space on the conveyor 25. Although the preferred embodiment shown in the drawings includes the buffer/brake system 12 disposed at the rear end 13 of each carrier 11, the buffer/brake system 12 may also be disposed at the front end 14 of each carrier 11. Further, buffer/brake systems 12 may be disposed at the front 14 and rear 13 ends of the carriers 11.

Although only one preferred embodiment of the present invention has been illustrated and described, it will at once be apparent to those skilled in the art that variations may be made within the spirit and the scope of the invention. Accordingly, it is intended that the scope of the invention be limited solely by the scope of the hereafter appended claims and not by any specific wording in the foregoing description.

I claim:

1. An improved carrier for use on a conveyor disposed within a trough with upwardly protruding sidewall means, the carrier comprising:
   pallet means having an upper surface for supporting a workpiece,
   means for engaging the conveyor and
   a buffer/braking system,
   the buffer/braking system including means for braking the carrier upon collision of the carrier with an object disposed on the conveyor,
   said means for braking the carrier including a flexible ring, the flexible ring being compressible longitudinally and being expandable laterally upon impact with a stationary carrier, lateral expansion of the ring resulting in frictional engagement of the ring with the upwardly protruding sidewall means, the frictional engagement of the ring with the upwardly protruding sidewall means substantially precluding movement of the carrier.

2. The carrier of claim 1, wherein the means for engaging the conveyor includes a front carrier guide and a rear carrier guide, the front carrier guide being attached to an undersurface of the carrier at a front portion thereof, the rear carrier guide being attached to the undersurface of the carrier a rear portion thereof.

3. The carrier of claim 2, wherein the rear carrier guide includes a channel for accommodating the ring and a bottom surface for engaging the conveyor, the ring extending around through the channel and protruding rearward out of the rear end of the carrier.

4. The carrier of claim 3, wherein the rear carrier guide is attached to the underside of the carrier at a first wall means disposed in front of the arcuate channel and the rear carrier guide is attached to the undersurface of the carrier at a second wall means disposed aft of the arcuate channel.

5. The carrier of claim 2, wherein the front carrier guide includes a channel for accommodating the ring and a bottom surface for engaging the conveyor, the ring extending around through the channel and protruding frontward out of the front end of the carrier.

6. The carrier of claim 5, wherein the front carrier guide is attached to the underside of the carrier at a rear wall means disposed aft of the channel and the front carrier guide is attached to the undersurface of the carrier at a front wall means disposed forward of the channel.

7. An improved carrier for use on a conveyor chain disposed within a support with upwardly protruding sidewall means, the carrier comprising:

a pallet means having an upper surface for supporting a workpiece, an undersurface, the undersurface of the pallet means including a front portion and a rear portion, the undersurface of the pallet means carrying means for engaging the conveyor and a buffer/braking system, the buffer/braking system being disposed at a rear portion of the undersurface of the pallet means, the buffer/braking system including means for braking the carrier upon collision of the carrier with a moving oncoming carrier disposed on the conveyor, said means for braking the carrier including a flexible ring, the flexible ring compressing longitudinally and expanding laterally upon impact with a rear end of a stationary carrier, lateral expansion of the ring resulting in frictional engagement of the ring with the upwardly protruding sidewall means, the frictional engagement of the ring with the upwardly protruding sidewall means substantially decreasing forward movement of the carrier.

8. The carrier of claim 7, wherein the means for engaging the conveyor includes a front carrier guide and a rear carrier guide, the front carrier guide being attached to the undersurface of the carrier at the front portion thereof, the rear carrier guide being attached to the undersurface of the carrier the rear portion thereof.

9. The carrier of claim 8, wherein the rear carrier guide including a channel for accommodating the ring and a bottom surface for engaging the conveyor, the ring extending around through the channel and protruding rearward out of the rear end of the carrier.

10. The carrier of claim 9, wherein the rear carrier guide is attached to the underside of the carrier at a rear wall means disposed forward of the channel and the rear carrier guide is attached to the undersurface of the carrier at second wall means disposed aft of the channel.

11. The carrier of claim 10, wherein the front carrier guide includes a substantially flat bottom surface for engaging the conveyor, a cylindrical wall and a top surface that is connected to the front portion of the undersurface of the carrier.

12. A combination carrier and conveyor system, the system comprising:

a conveyor system including a moving conveyor associated with a stationary track including upwardly protruding sidewall means, a carrier received within the track and on top of the conveyor and being movable along the track by the conveyor, the carrier including a pallet means, the pallet means including an upper surface for supporting a workpiece, an undersurface, the undersurface including a front portion and a rear portion, the undersurface of the pallet means including a front carrier guide and a rear carrier guide, the front carrier guide being attached to the undersurface of the carrier at the front portion thereof, the rear carrier guide being attached to the undersurface of the carrier at the rear portion thereof, the front carrier guide and the rear carrier guide engaging the conveyor, the rear carrier guide including a buffer/braking system, the buffer/braking system including a channel bound by a rear wall, a post, a bottom surface and the rear portion of the undersurface of the pallet means, at least a portion of the ring being contained within the channel and at least a portion of the ring extending rearward beyond a rear end of the carrier, the flexible ring compressing longitudinally and expanding laterally upon impact with a front end of an oncoming carrier, lateral expansion of the ring resulting in frictional engagement of the ring with the upwardly protruding sidewall means of the track, the frictional engagement of the ring with the upwardly protruding sidewall means substantially decreasing forward movement of the carrier.

13. The system of claim 12, wherein the channel is arcuate in configuration, the rear wall being attached to the undersurface of the carrier and the post being attached to the undersurface of the carrier.

14. The carrier of claim 13, wherein the front carrier guide includes a substantially flat bottom surface for engaging the conveyor, a single cylindrical wall and a top surface that is connected to the front portion of the undersurface of the carrier.

15. An improved carrier for use on a conveyor disposed within a trough with upwardly protruding sidewall means, the carrier comprising:

pallet means having an upper surface for supporting a workpiece, an undersurface, the undersurface of the pallet including a front portion and a rear portion, the undersurface of the pallet means carrying means for engaging the conveyor and a buffer/braking system, the buffer/braking system being disposed at a front portion of the undersurface of the pallet means, the buffer/braking system including means for braking the carrier upon collision of the carrier with a stationary carrier disposed on the conveyor, said means for braking the carrier being attached to the front portion of the undersurface of the pallet means and including a flexible ring, the flexible ring compressing longitudinally and expanding laterally upon impact with a rear end of a stationary carrier, lateral expansion of the ring resulting in frictional engagement of the ring with the upwardly protruding sidewall means, the frictional engagement of the ring with the upwardly protruding sidewalls substantially decreasing forward movement of the carrier.

16. The carrier of claim 15, wherein the means for engaging the conveyor includes a front carrier guide and a rear carrier guide, the front carrier guide being attached to the undersurface of the carrier at the front portion thereof, the rear carrier guide being attached to the undersurface of the carrier the rear portion thereof.

17. The carrier of claim 16, wherein the front carrier guide including a channel for accommodating the ring and a bottom surface for engaging the conveyor, the ring extending around through the channel and protruding outward in front of a front end of the carrier.

18. The carrier of claim 17, wherein the front carrier guide being attached to the underside of the carrier at a rear wall disposed aft of the arcuate channel and the front carrier guide being attached to the undersurface of the carrier at a front wall disposed forward of the arcuate channel.

19. The carrier of claim 18, wherein the rear carrier guide includes a substantially flat bottom surface for engaging the conveyor, a cylindrical wall and a top surface that is connected to the rear portion of the undersurface of the carrier.

20. A combination carrier and conveyor system, the system comprising:

a conveyor system including a moving conveyor associated with a stationary track including upwardly protruding sidewalls, a carrier received within the track and on top of the conveyor and being movable along the track by the conveyor, the carrier including a pallet, the pallet including an upper surface for supporting a workpiece, an undersurface, the undersurface including a front portion and a rear portion, the undersurface including a front carrier guide and a rear carrier guide, the front carrier guide being attached to the undersurface of the carrier at the front portion thereof, the rear carrier guide being attached to the undersurface of the carrier at the rear portion thereof, the front carrier guide and the rear carrier guide engaging the conveyor, the front carrier guide including a buffer/braking system, the buffer/braking system including a channel bound by a rear wall, a front wall, a bottom surface and the front portion of the undersurface of the carrier, at least a portion of the ring being contained within the channel and at least a portion of the ring extending frontward beyond a front end of the carrier, the flexible ring compressing longitudinally and expanding laterally upon impact with a rear end of a stationary carrier, lateral expansion of the ring resulting in frictional engagement of the ring with the upwardly protruding sidewalls of the track, the frictional engagement of the ring with the upwardly protruding sidewalls substantially decreasing forward movement of the carrier.

21. The system of claim 20, wherein the channel is arcuate in configuration, the rear wall being attached to the undersurface of the carrier and the front wall being attached to the undersurface of the carrier.

22. The carrier of claim 21, wherein the rear carrier guide includes a substantially flat bottom surface for engaging the conveyor, a single cylindrical wall and a top surface that is connected to the rear portion of the undersurface of the carrier.

23. In a method of conveying in a conveyor system having pallet means which move by friction contact with a conveyor chain, the steps, in forming a queue of said pallet means, of providing first and second pallet means each having a self-contained buffer-braking means, moving one of said pallet means toward the other of said pallet means, said other pallet means being in a stationary, queued position, activating a buffer-braking means upon contact of one pallet means with the other of said pallet means, absorbing impact force by said last named activated buffer-braking means, and transmitting some of said absorbed impact force from the buffer-braking means to the conveyor means, whereby shock forces resulting from contact of said pallet means are not transmitted to objects carried by the stationary pallet means.

24. The method of claim 23, wherein the buffer-braking means is disposed at a rear portion of each of said pallet means.

25. The method of claim 24, wherein the buffer-braking means is disposed at a front portion of each pallet means.

* * * * *